(12) United States Patent
Qi et al.

(10) Patent No.: US 11,606,261 B2
(45) Date of Patent: *Mar. 14, 2023

(54) DATA SERVICE OVERLOAD DETECTION AND MITIGATION

(71) Applicant: Home Box Office, Inc., New York, NY (US)

(72) Inventors: Mei Qi, Bellevue, WA (US); Jinjiang Zeng, Mercer Island, WA (US); Rick Kilgore, Seattle, WA (US); Xinkai Wang, Bellevue, WA (US); Fred Mameri, New York, NY (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/475,478

(22) Filed: Sep. 15, 2021

(65) Prior Publication Data

US 2022/0006703 A1     Jan. 6, 2022

Related U.S. Application Data

(63) Continuation of application No. 16/009,729, filed on Jun. 15, 2018, now Pat. No. 11,153,174.

(51) Int. Cl.
*G06F 15/16* (2006.01)
*H04L 41/14* (2022.01)
(Continued)

(52) U.S. Cl.
CPC ............. *H04L 41/14* (2013.01); *H04L 47/11* (2013.01); *H04L 47/12* (2013.01); *H04L 67/02* (2013.01); *H04L 67/01* (2022.05)

(58) Field of Classification Search
CPC ................................ H04L 47/11; H04L 47/12
See application file for complete search history.

(56) References Cited

U.S. PATENT DOCUMENTS 6,404,768 B1   6/2002  Basak et al.
6,556,578 B1   4/2003  Silberschatz et al.
(Continued)

OTHER PUBLICATIONS

International Search Report and Written Opinion for International Application Serial No. PCT/US2019/037432 dated Aug. 28, 2019, 14 pages.

(Continued)

*Primary Examiner* — Hieu T Hoang
(74) *Attorney, Agent, or Firm* — Amin, Turocy & Watson, LLP

(57) ABSTRACT

The described technology is directed towards presenting a server overload condition that can result from a spike in client requests. Upon receiving an incoming client request for data at a server, a request buffer condition of a client request buffer (e.g., a counter) is evaluated to determine whether the client request corresponds to an anticipated overload state with respect to a request-handling capability of the server, e.g., whether the client request buffer is full. If so, an overload response (e.g., a retry response) is returned to the client indicating so that the client retries a corresponding client request after a time delay. If not in the anticipated overload state, the request is further processed, e.g., to provide a regular response containing the requested data, such as by adding a request information entry associated with the incoming client request to the client request buffer and updating the request buffer condition.

20 Claims, 10 Drawing Sheets

(51) Int. Cl.
*H04L 67/02* (2022.01)
*H04L 47/11* (2022.01)
*H04L 47/12* (2022.01)
*H04L 67/01* (2022.01)

(56) References Cited

U.S. PATENT DOCUMENTS

| | | |
|---|---|---|
| 6,839,321 B1 | 1/2005 | Chiruvolu |
| 6,870,810 B1 | 3/2005 | Cohen |
| 6,990,529 B2 | 1/2006 | Yang et al. |
| 7,046,665 B1 | 5/2006 | Walrand et al. |
| 7,660,894 B1 | 2/2010 | Carrie |
| 7,734,605 B2 | 6/2010 | Chouanard et al. |
| 8,463,909 B1 | 6/2013 | Szabo et al. |
| 9,929,829 B1 | 3/2018 | Huang et al. |
| 2003/0007453 A1 | 1/2003 | Ogier et al. |
| 2003/0058871 A1 | 3/2003 | Sastry et al. |
| 2003/0223362 A1 | 12/2003 | Mathews et al. |
| 2006/0089122 A1 | 4/2006 | Zavalkovsky et al. |
| 2007/0070907 A1 | 3/2007 | Kumar et al. |
| 2007/0133411 A1 | 6/2007 | Bosch et al. |
| 2007/0253412 A1 | 11/2007 | Batteram et al. |
| 2008/0133300 A1 | 6/2008 | Jalinous |
| 2008/0186918 A1 | 8/2008 | Tinnakornsrisuphap et al. |
| 2009/0156213 A1 | 6/2009 | Spinelli et al. |
| 2009/0304020 A1 | 12/2009 | Bodin et al. |
| 2011/0211449 A1 | 9/2011 | Attar et al. |
| 2011/0286468 A1 | 11/2011 | Tomonaga et al. |
| 2012/0092996 A1 | 4/2012 | Lautenschlaeger |
| 2013/0016610 A1 | 1/2013 | Kutcher et al. |
| 2013/0272121 A1 | 10/2013 | Stanwood et al. |
| 2013/0298170 A1 | 11/2013 | ElArabawy et al. |
| 2014/0089484 A1 | 3/2014 | Chin et al. |
| 2014/0293801 A1 | 10/2014 | Dimou et al. |
| 2015/0120808 A1 | 4/2015 | Bielski et al. |
| 2015/0244639 A1 | 8/2015 | Iordache et al. |
| 2015/0381505 A1 | 12/2015 | Sundararaman et al. |
| 2017/0171832 A1* | 6/2017 | Joshi .................... H04W 76/19 |
| 2018/0375902 A1 | 12/2018 | Wong et al. |
| 2019/0074961 A1 | 3/2019 | Tanizawa |
| 2020/0074566 A1 | 3/2020 | Jain |

OTHER PUBLICATIONS

International Preliminary Report on Patentability received for PCT Application Serial No. PCT/US2019/037432 dated Dec. 24, 2020, 9 pages.

Cpanel Documentation | HTTP Error Codes and Quick Fixes, Oct. 13, 2017 (using Waback Machine), 2017, pp. 1-3.

Communication pursuant to Article 94(3) EPC received for EP Application Serial No. 19745334.3 dated Jan. 27, 2023, 4 pages.

\* cited by examiner

DATA SERVICE OVERLOAD DETECTION AND MITIGATION

CROSS-REFERENCE

This application is a continuation of and claims priority to U.S. patent application Ser. No. 16/009,729, filed Jun. 15, 2018, and entitled "DATA SERVICE OVERLOAD DETECTION AND MITIGATION." The entirety of the foregoing application is hereby incorporated by reference.

BACKGROUND

Many contemporary computing device programs have an online component that makes requests to external data services as an online client. To scale up to handle large numbers of such client requests, a typical data service solution is to have the client requests received at a load balancer, which distributes the client requests among possibly many data service servers, often referred to as server instances. The servers then process and send responses to the client requests.

One of the operations that a data service server performs is to respond to periodic heartbeat detection requests from the load balancer, e.g., sent over a particular URL that the load balancer and server understand is for heartbeat communication. When heartbeats are not detected from a data service server, that data service server is taken down and restarted.

A data service runs into problems when large, sudden client request loads occur, sometimes at unpredictable moments. In general, such spikes in demand overload the data service servers as the servers try to keep up with the many client requests for data. When overloaded, a data service server often cannot respond to heartbeat detection, causing its restart, even though the service is generally otherwise functional. Taking down the server for a restart operation further strains the other overloaded servers.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, aspects of the technology described herein are directed towards preventing server overload conditions. Upon receiving an incoming client request for data at a server, aspects comprise evaluating a request buffer condition of a client request buffer to determine whether the client request corresponds to an anticipated overload state with respect to request-handling capabilities of the server. If evaluating the request buffer condition determines that the incoming client request corresponds to an anticipated overload state, described herein is returning a response to the client indicating that the client is to retry a corresponding client request after a time delay. If evaluating the request buffer condition determines that the incoming client request does not correspond to the anticipated overload state, aspects comprise adding a request information entry associated with the incoming client request to the client request buffer and updating the request buffer condition.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards preventing servers from being overloaded with client data requests. In general and as described herein, before buffering a client data request for handling, the condition of the buffer is evaluated to determine whether subsequent handling of this client request leads to an anticipated overload condition. If not, the request is buffered, e.g., for regular handling, otherwise a response to the request is returned indicating the anticipated overload condition. The response can indicate that a corresponding request be retried after a delay time; in one or more implementations, the delay time can be specified in the response.

In one or more aspects, the condition of the buffer is tracked via an overload counter that maintains information (e.g., a simple entry count) as to how full the buffer is. In one or more implementations, the overload counter is increased when a new client request entry is put into the buffer, and decreased when a buffered client request entry is removed from the buffer for processing. When an incoming client request is received, the overload counter is compared against a threshold value that determines whether the server is in an anticipated overload state or not. In this way, the client request buffer cannot get too full and cause an actual server overload.

It should be understood that any of the examples herein are non-limiting. For instance, some of the examples refer to HTTP: (HyperText Transfer Protocol) requests and responses, however the technology is not limited to any request/response protocol. As another example, the technology is exemplified as being implemented in a data service server that services remote clients, however, the technology described herein can be implemented in a single server, or in any data-provided entity that can be overloaded with requests, including local requests. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and data communication in general.

Figure 1:
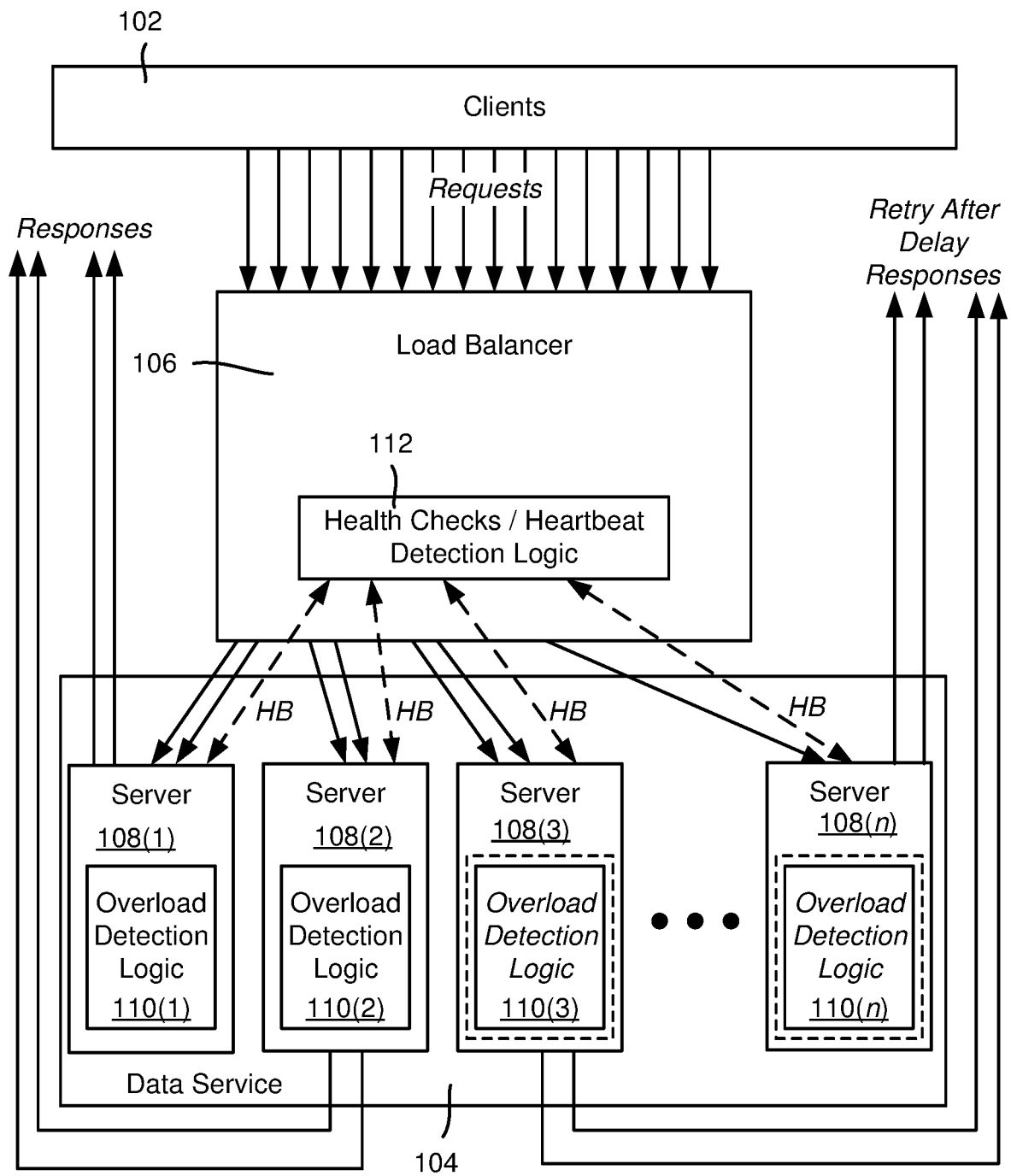
FIG. 1 is a block diagram representing example components that handle client requests for data including via servers with overload detection capabilities, according to one or more example implementations.

FIG. 1 is a block diagram representing example components that may be used to provide aspects of the technology described herein and/or work in conjunction with the technology described herein. In FIG. 1, requests from clients 102 to a data service 104 are received at a load balancer 106, (which may be considered part of the data service 104). As is known, the load balancer 106 distributes the requests, e.g., via an appropriate load balancing technique such as round-robin distribution, to servers 108(1)-108(n) of the data service 104.

As described herein, the exemplified servers 108(1)-108(n) include overload detection logic 110(1)-110(n), which detects when a server is in an "anticipated overload" state, which as used herein means that the server is still currently operational however any additional load on the server may cause the server to not properly respond to health check/heartbeat (HB) detection, e.g., as represented by the slanted dashed lines labeled HB in FIG. 1. As is known, as a server instance becomes overloaded, the server instance responds with increased latency as the server instance uses more and more resources, and eventually results in the server instance being unable to timely comply with health checks/heartbeat detection. Failure to comply with health checks/heartbeat detection causes health checks/heartbeat detection logic 112 of (a health related component incorporated into) the load balancer 106 to restart the server instance. Note that restarting a server instance can distribute the load among the remaining servers, which can cause one or more of the remaining server's health check/heartbeat compliance responses to fail, and so on.

As described herein, the overload detection logic (e.g., 110(1)) detects the anticipated overloaded state, and takes action to prevent an actual overload that would cause a server failure. In one more aspects, the overload detection logic 110(1) (using relatively few computing resources) returns a response to the client request indicating that the client request is to be retried after a delay time. The response may indicate the delay time, or a default delay time may be used by the client.

By way of example, in an HTTP: protocol environment, when the anticipated overload state is detected at a server's overload detection logic 110(1), a '509' response can be directly returned in response to the client request, which can specify a delay time. Note that this is in contrast to a conventional '503' Service Unavailable response, which would cause the client to immediately resend the request, likely not giving the server sufficient time to reduce its load. Instead, the '509' "retry after a delay time" response gives the server time to process its outstanding requests, e.g., pending in a request buffer or the like. It should be noted that a '509' response is not an official HTTP response code, and the clients and the servers thus can negotiate a contract or the like on how to handle such a response. For example, the service can send a '509' response with a header "x-retry-interval: 3000" to ask the client to retry in 3 seconds. In this way, for example, a server can adjust the interval according to how many '509' responses were recently sent out previously, thereby controlling the number and/or timing of the retries.

Figure 2:
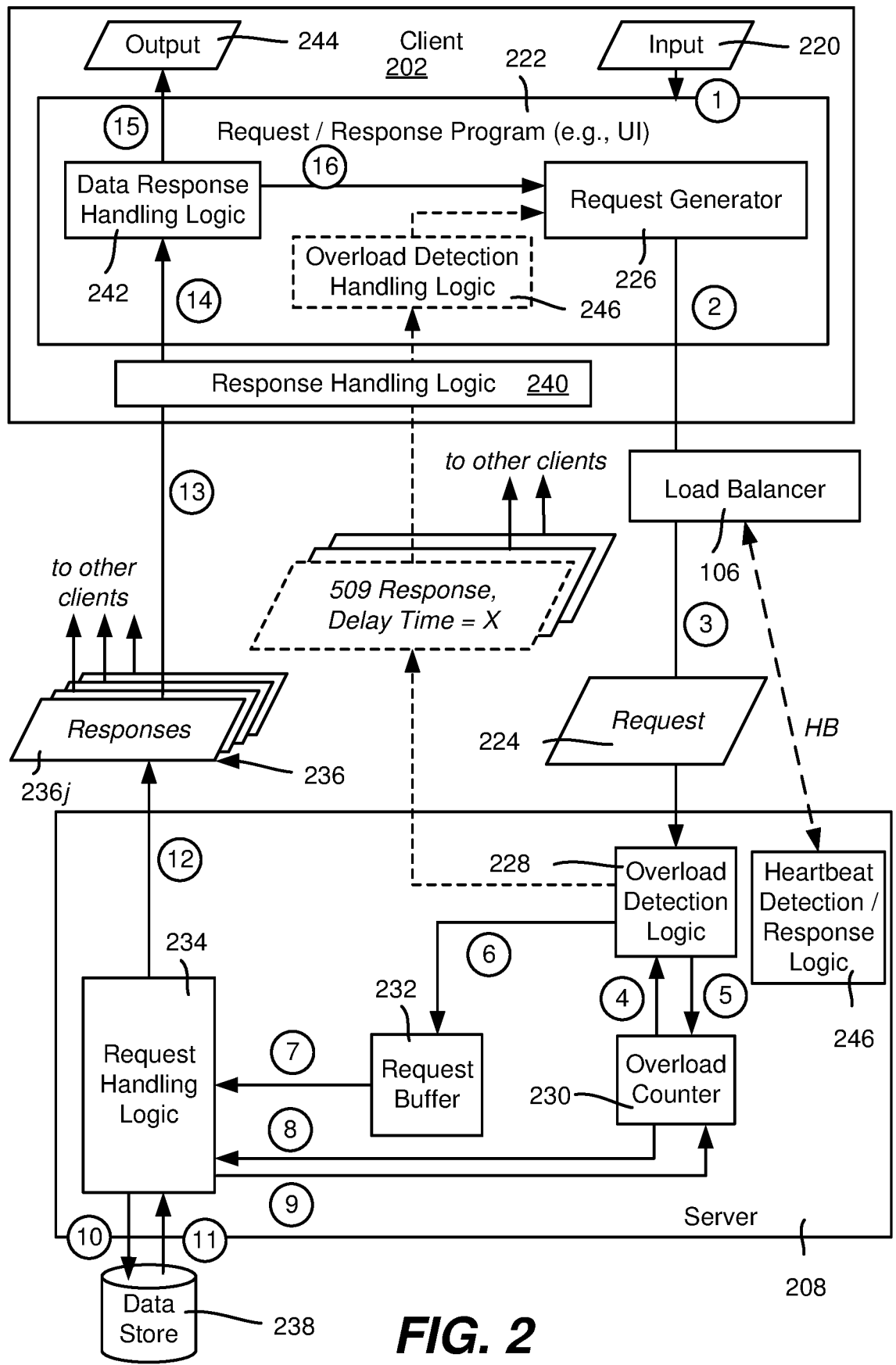
FIG. 2 is a block diagram representing example components of a client and server with overload detection capability, in which an overload state is not currently anticipated, according to one or more example implementations.

FIG. 2 shows aspects of the overload detection and prevention technology described herein from the perspective of a client 202 and a server (instance) 208. In the example of FIG. 2, input 220 to a request/response program 222 (such as an application's user interface, or UI), as represented by the arrow labeled one (1), causes a request 224 to be generated by a request generator 226 (the arrow labeled two (2)). For example, the request can be a "HTTP: GET" request or the like for data from the data service 104 of FIG. 1.

In this particular example, the request 224 is distributed by the load balancer 106 to the server 208 (arrow three (3)). As described herein, overload detection logic 228 receives the incoming request 224, and decides how to handle the request 224 with respect to the anticipated overload state. In one or more implementations, the overload detection logic evaluates a current request buffer condition, e.g., reads an overload counter 230 (arrow four (4)) that tracks the current number of outstanding requests in a request buffer 232; (the overload counter can thus be considered a request buffer counter). If the number is at a threshold value, e.g., fifty, (which may be a configurable value based on any one or more criteria such as processing power, memory, etc., of this particular server instance), then an anticipated overload condition is detected. In the example of FIG. 2, however, the anticipated overload state has not been reached, and thus the overload counter is incremented (arrow five (5)) and the request (e.g., an information entry associated with the request, which may be the request data itself, is placed in the request buffer (arrow six (6)). Note that the information entry associated with the request can be the request data itself, however rather than copy the request data into the buffer, a pointer, index or the like to the request data (e.g., already loaded in memory) may be placed in the buffer as the information entry associated with the request.

As represented in FIG. 2 by arrow seven (7)), request handling logic 234 processes outstanding requests, to return appropriate responses 236 to clients (arrow twelve (12)), including a response 236j to the client 220 corresponding to the request 224 (arrow thirteen (13)). Before returning a response, in this example the request handling logic 234 removes a request information entry from the request buffer 232, and, (after reading the overload counter 230 to ensure it is not already at zero (arrow eight (8)), decrements the overload counter 230 (arrow eight (9)). Note that the response may comprise data obtained from an external data store 238 (arrows ten (10) and eleven (11)), however instead of or in addition to external data, internal data, cached data and so on may be a source or partial source of the returned data. Further note that the response may be an error response code or the like (but typically not an error related to overload, which ordinarily would have been detected by the overload detection logic 228).

In the example of FIG. 2, response handling logic 240 of the client 202 recognizes that the response is intended for the program 222, where it sent for processing (arrow fourteen ((14)) by data response handling logic 242, such as to render output 244 (arrow fifteen ((15)). Note that in some circumstances, the data response handing logic 242 may communicate with the request generator 226 (arrow sixteen ((16)), e.g., to retrieve related/further data based on the returned response data.

In this way, a client and server operate normally until the request buffer 232 gets too full, as detected by an overload counter 230 evaluated against a threshold value. Note that FIG. 2 shows heartbeat detection response logic 246 complying with health check/heartbeat requirements (the slanted dashed line labeled HB). More generally, the server communicates with a component of the data service (e.g., the load balancer) to provide health-related information that indicates that the server is currently operational.

Figure 3:
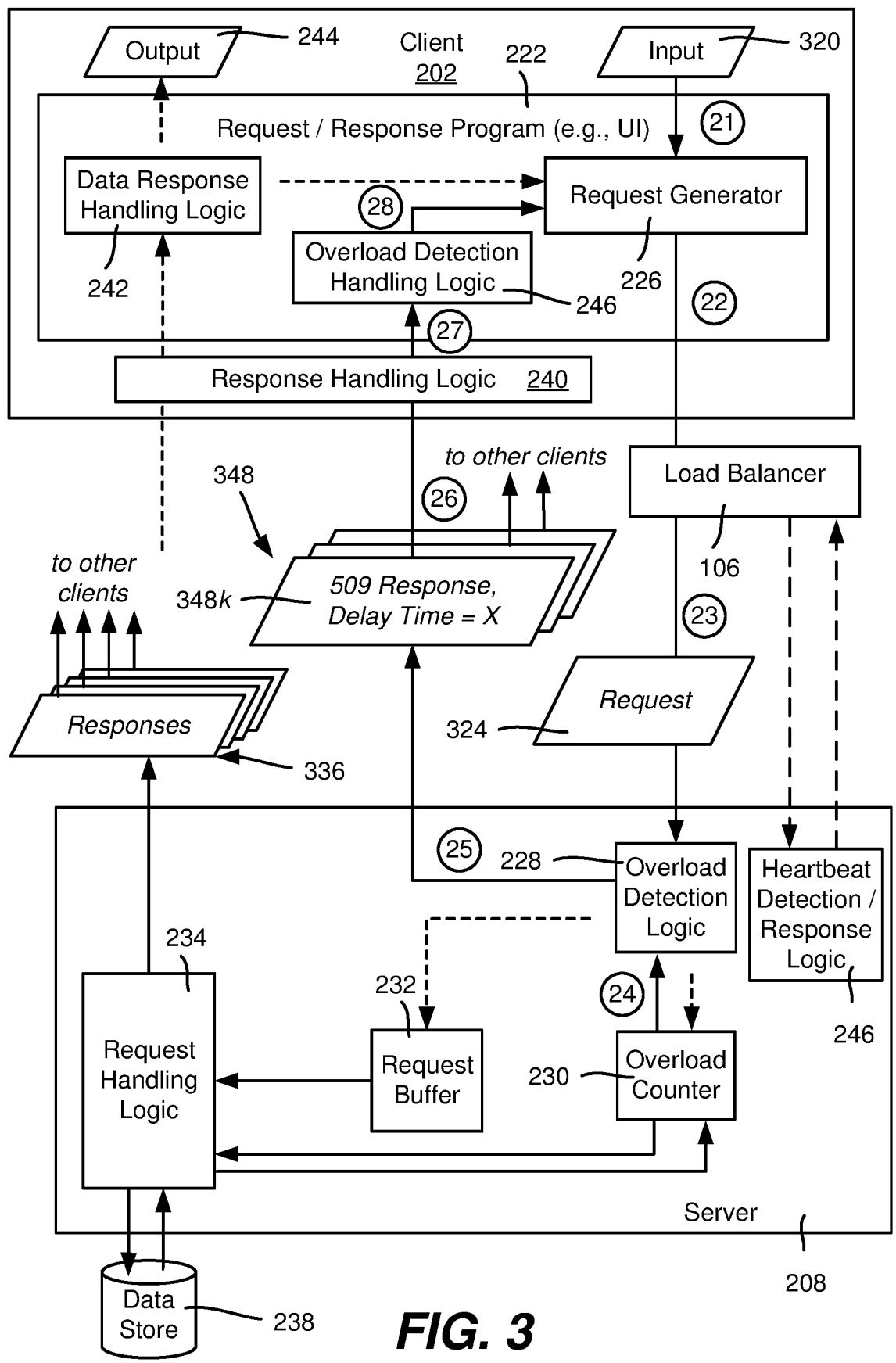
FIG. 3 is a block diagram representing example components of a client and server with overload detection capability, in which an anticipated overload state is detected, according to one or more example implementations.

FIG. 3 shows aspects of the overload detection and prevention technology again described herein from the perspective of the client 202 and the server (instance) 208; however in FIG. 3 the server instance 208 is in the anticipated overload state. Thus, in the example of FIG. 3, further input 320 to the request/response program 222 (such as an application's user interface, or UI), as represented by the arrow labeled twenty-one (21), causes another request 324 to be generated by a request generator 226 (the arrow labeled twenty-two (22)). For example, the request can be a "HTTP: GET" request or the like for data from the data service 104 of FIG. 1.

In this particular example, this other request 324 is distributed by the load balancer 106 to the server 208 (arrow twenty-three (23)). As described herein, the overload detection logic 228 receives the request 324, and decides how to handle the request 324 with respect to the anticipated overload state. In one or more implementations, as described above, the overload detection logic reads the overload counter 230 (arrow twenty-four (24)) that tracks the current number of outstanding requests in the request buffer 232. If the number is at the threshold value, then an anticipated overload condition is detected.

In the example of FIG. 3, in contrast to the example of FIG. 2, the anticipated overload state has been reached. Note that unlike FIG. 2, the overload counter 230 is not incremented nor is the request placed in the request buffer 232 in the exemplified implementation of FIG. 3.

Instead, the overload detection logic 228 generates (or causes to be generated) a "retry-after-delay" response 348k indicating that the client 202 should reattempt the request after some delay time, (arrow twenty-five (25)); the delay interval may be included in the response. In the example of FIG. 3, the response is an HTTP: 509 response, and includes a delay time equal to X, such as 1000 milliseconds. In this anticipated overload state, the overload detection logic 228 also may send "retry-after-delay" responses (collectively labeled 348) to other clients, as well as with respect to any other requests sent by the client 202.

Note that the request handling logic 234 continues to process outstanding requests that are pending in the request buffer 232, to return appropriate responses 336 to clients. This may or may not include a response to the client 220 for some other previously made request, that is, one that does not correspond to the request 324 at this time. In this way, the request buffer 232 gets drained and the overload counter gets reduced while the client 202 (and possibly other clients) wait(s) to resend a request.

In the example of FIG. 3, response handling logic 240 of the client 202 receives the response 348k (arrow twenty-six ((26)), recognizes that the response is intended for the program 222, but that the response 348k is an overload-related response. In this example, the response 348k is sent for processing by overload detection handling logic 246 (arrow twenty-seven ((27)), such as to delay and then communicate with the request generator 226 (arrow twenty-eight ((28)), or some other logic of the program 222, e.g., to regenerate a request corresponding to the original request.

In this way, a server stops handling requests for data when the request buffer 232 gets too full (although it is understood that new requests can be buffered for handling at the rate that pending requests are handled). Instead, only a relatively small amount of resources are used to throttle client requests via "retry-after-delay" responses. As a result of avoiding actual overload, the heartbeat detection response logic 246 is able to continue to comply with health check/heartbeat requirements (the slanted dashed line labeled HB) and the server continues to respond to as many pending requests as quickly as possible without being restarted by the load balancer (assuming no other failure occurs).

Figure 4:
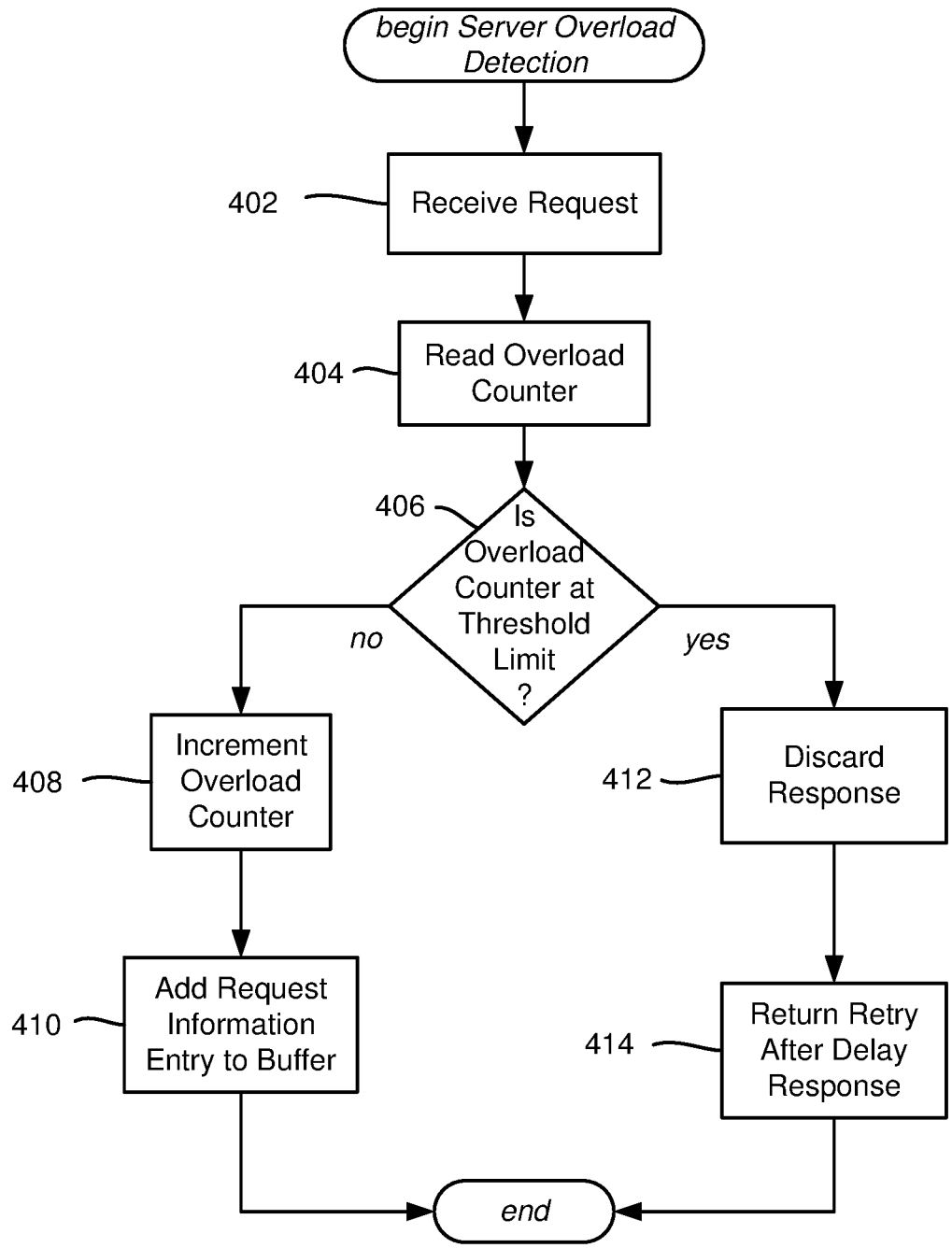
FIG. 4 is a flow diagram representing example logic/operations that can be performed by a server with respect to detecting whether an anticipated overload state exists, and subsequent operations, according to one or more example implementations

FIG. 4 is a flow diagram showing example operations that may be taken by server overload detection logic, e.g., the logic 228 of FIGS. 2 and 3. Operation 402 represents receiving a request at the server, at the point where the request reaches the server overload detection logic. Operation 404 reads the overload counter and operation 406 evaluates whether the overload counter is at the threshold limit. If not at the limit, operation 408 increments (or otherwise increases/modifies) the overload counter and operation 410 adds an associated request information entry to the pending request buffer as generally described herein. Note that operations 408 and 410 may be performed transactionally as a critical section/mutual-exclusion operation or the like so that the count remains correct as the request handling logic, e.g., operating in parallel, is removing request items from the buffer and decrementing the overload counter.

If instead the limit has been reached as evaluated by operation 406, operation 412 discards the request, which may or may not delete the request from the server. Note that "discard" can, for example, only mark the request for discarding (e.g., via later garbage collection), in that some or all of the requests can be maintained, and/or any results of processing of the request can be maintained, knowing that a retry after the delay is likely to occur. For example, (at the cost of a relatively small amount of memory), a server may use less processing resources when dealing with a repeated request recognized as corresponding to one that is marked for discarding but is still present to some extent in memory.

Operation 414 returns the "retry-after-delay" response, e.g. the HTTP: 509 response, which may include a delay time. In general, most of the response can be preloaded into and copied from memory to provide efficient response generation when needed. Note that some hysteresis or the like may be used, e.g., trigger the HTTP: 509 responses once the overload counter reaches fifty, and continue to do so until the overload counter/request buffer is reduced to forty-five.

As can be seen, the operations of FIG. 4 can be implemented using relatively few computing resources. Note further that although not shown, a mechanism such as another counter may be used to track how many HTTP: 509 responses have been sent, e.g., over a given time period and/or with respect to successfully handled requests, or the like, to assist operators of the data service in allocating resources in the future.

Figure 5:
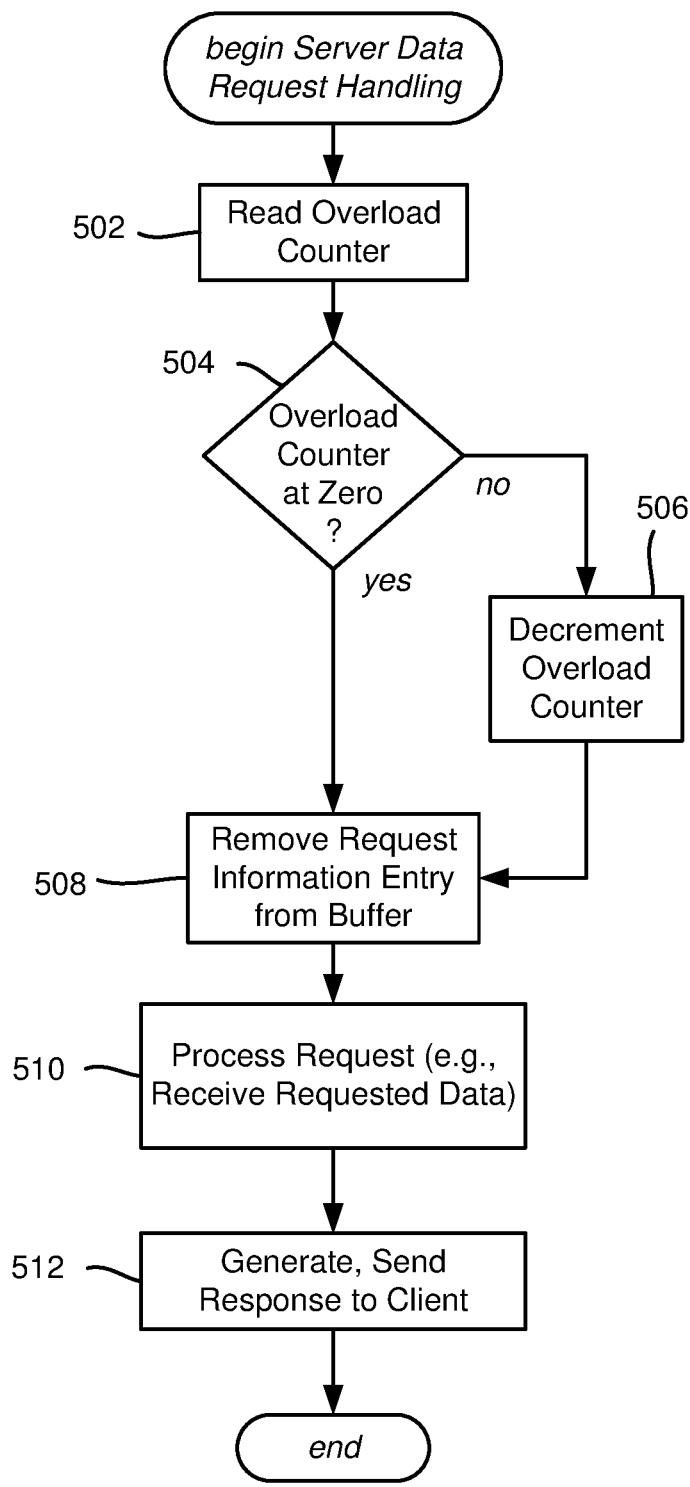
FIG. 5 is a flow diagram representing example logic/operations that can be performed by a server with respect to handling client requests for data while tracking possible overload-related conditions, according to one or more example implementations.

FIG. 5 shows example operations of the data request handling logic of a server when a request is to be processed from the buffer, beginning at operation 502 where the overload counter is read. Operation 504 represents checking whether the overload counter is already at zero, and if not operation 506 decreases the overload counter. Note that operation 504 may be unnecessary if the counter value is guaranteed to be correct, e.g. via critical section/mutual-exclusion protection, and thus as represented here in only may be a safety check to ensure that the counter never goes negative. Note further that it is basically an identical concept to count in the opposite direction, e.g., start a "buffer count remaining" counter at the threshold value and decrease such a counter when an item is added to the buffer, and increase the counter when an item is removed from the buffer.

As can be readily appreciated, maintaining a counter is only one relatively efficient way to determine whether or not a buffer is full. Other ways can include evaluating the difference between buffer start and end pointers, and so on.

Operation 508 removes the request information entry from the buffer, which as described herein may be the relevant request data itself, or a pointer (or index or the like) to the request data, in which event operation 508 also accesses the request data. Again, note that operations 506 and 508 (and possibly also operation 504) may need to be performed as a critical section to ensure that the count remains correct, because the overload detection process can be otherwise incrementing the overload counter generally in parallel.

Operation 510 represents the data request handling logic processing the request, e.g., obtaining the requested data. Operation 512 represents generating and sending the response to the client. Note that the response may comprise the data, but alternatively may comprise an error, e.g., if the data could not be obtained.

It is understood that at least some of the server operations of FIGS. 4 and 5, as well as other flow diagrams described herein, can be combined into a single process. Further, at least some of the operations of FIGS. 4 and/or 5, as well as other flow diagrams described herein, can be performed in parallel with other operations. Still further, it is understood that the ordering of at least some of the operations can differ from that in the example flow diagrams. Thus, the technology is not limited to the example components and/or example operations shown herein, nor to their exemplified separation and/or ordering as described herein.

While the example operations of FIGS. 4 and 5 provide an actual implementation that prevents server overload, it is understood that the concepts of FIGS. 4 and 5 can be extended. For example, different request buffers may be used for different types of requests. For example, certain types of requests can be detected as being able to be handled with low computing resources, while other types of requests may correspond to resource-intensive requests. Overload detection can be configured to detect and sort such different requests into different buffers, for example, and each different type of request buffer may have a different threshold value. In this way, requests that can be handled efficiently and quickly can have priority over requests that need to be handled with more time/resources.

Alternatively, a single buffer may be used for different types of requests. However, instead of incrementing a counter, a weight may be added to a counter that varies depending on the type of request. For example, request type A has weight one, while request type B has weight three, because, (as determined by testing for example), three request type A's can be handled in the same time/using the same amount of computing resources as one request type B. The overload counter threshold can be set to an appropriate value that avoids server overload whether all type A, all type B or a mix of type A and type B fill the buffer to the allowed amount. In this way, a spike in (mostly) type A requests avoids sending HTTP: 509 responses (at least for a while) based on an overload counter threshold set conservatively as if all requests were the same type, to protect against the worst case scenario of a spike in type B requests, yet still avoids server overload.

Figure 6:
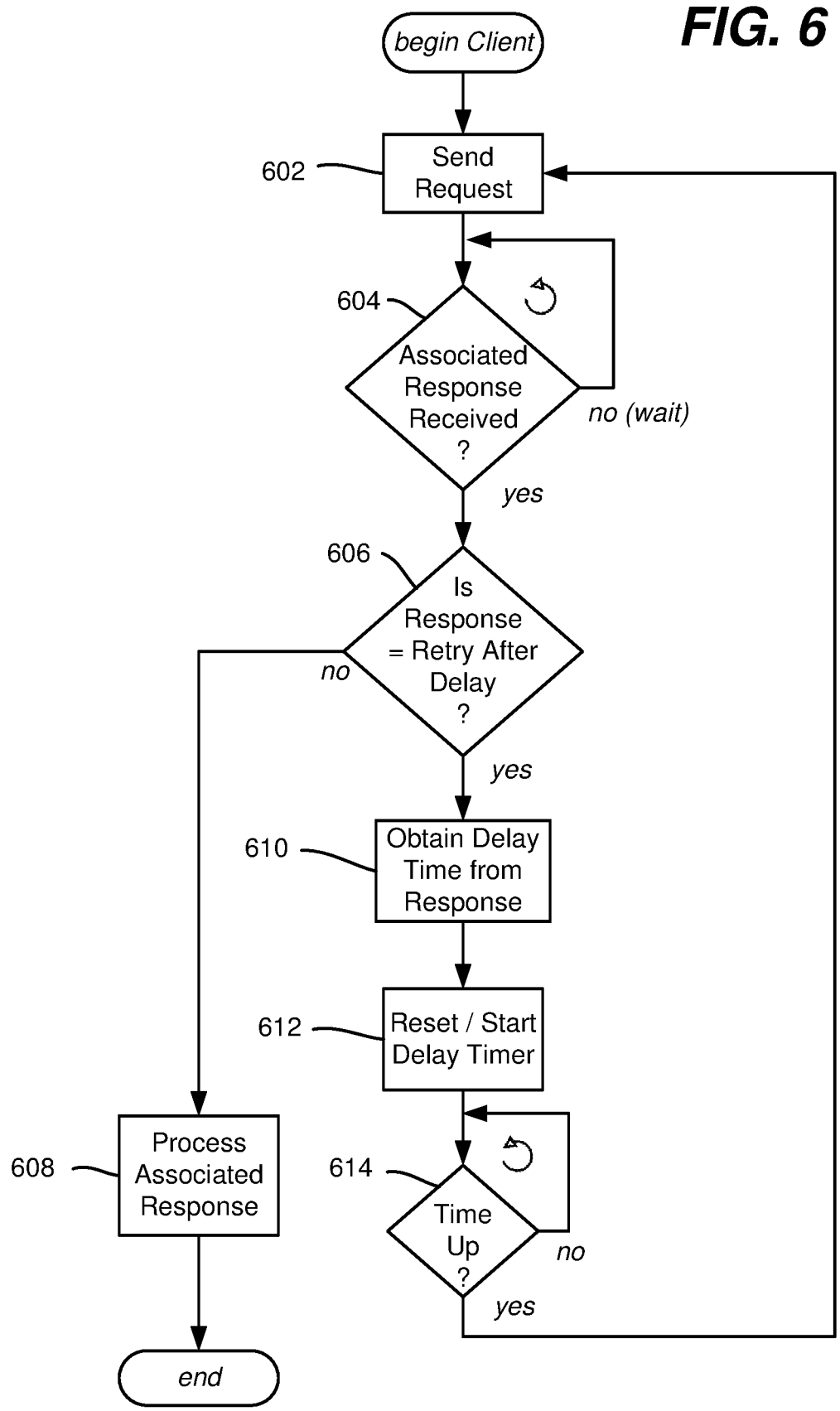
FIG. 6 is a flow diagram representing example logic/operations that can be performed by a client with respect to sending client requests for data and handling a response that corresponds to a server's anticipated overload state, according to one or more example implementations.

FIG. 6 shows example operations of the client, beginning at operation 602 which represents sending a request. Operation 604 represents waiting until the response associated with the request at operation 602 has been received; note that the waiting is typically not a loop, but instead can be based on event driven concepts.

Once a response is received, operation 606 evaluates whether the response is a "retry-after-delay" response as described herein, e.g. an HTTP: 509 response. If not, operation 606 branches to operation 608 which represents processing the associated response.

If an operation 606 the response is a "retry-after-delay" response, operations 610 represents obtaining the delay time from the response. Note that if a delay time is not provided, a default delay time may be used.

Operation 612 represents resetting and starting a delay timer. Operation 614 represents waiting until the time is reached, and again can be (and typically is) event driven rather than an actual loop. When the time has been reached, operation 614 returns to the operation 602 to resend the request. Although not shown, some retry limit counter or the like may be present to prevent against trying indefinitely without attempting something else.

Note that in some circumstances, it is feasible for a client to hold up other requests for data while in the delaying time (e.g., of operation 614). For example, if a client has just received retry-after-delay responses for a number of near-simultaneous requests, the client may not send a further, similar request until after some delay (not necessarily the same amount of delay as in operation 614; such a different delay may be shorter, for example, to not wait the full amount of time for some independent data). Further, if a client knew or could determine that it was regularly having its requests load-balanced to the same server, the client may also delay based on the likelihood that that this server was near-overloaded. Note that in many situations a subsequent request depends on the data returned in a response to a previous request, so sometimes such a delay may be inherent without any further delay considerations by a client.

In general, the technology described herein resolves a problem that can occur with an unanticipated spike in client requests. Typically, if a spike in client requests is anticipated, extra servers can be allocated in advance. For example, consider that a very large number of requests related to a popular television show are known to come in at 9:00 PM eastern time when the show debuts; in such a situation, extra servers are allocated to avoid disappointing or frustrating client viewers. In certain unanticipated spike scenarios, servers can be added as needed, however it takes a reasonable amount of time (e.g., on the order of minutes) to spin up such additional servers. Accordingly, the technology described herein fits in well with an add-server-on-demand scenario, in that the technology described herein prevents overloading existing servers (and causing otherwise unnecessary restarts) until the additional server(s) can be spun up.

As can be seen, server overload can be avoided via the technology described herein, in which an anticipated server overload state is detected and actions taken to prevent an actual server overload condition. In the anticipated overload state, the server responds with a "retry-after-delay" delay response, which is a highly efficient response relative to conventional response handling while at the same time throttling further client requests. This technology gives the server time to reduce its pending requests, yet without a conventional '503' Service Unavailable response or the like that would cause clients immediate retries, and thereby prolong a spike in client requests.

Figure 7:
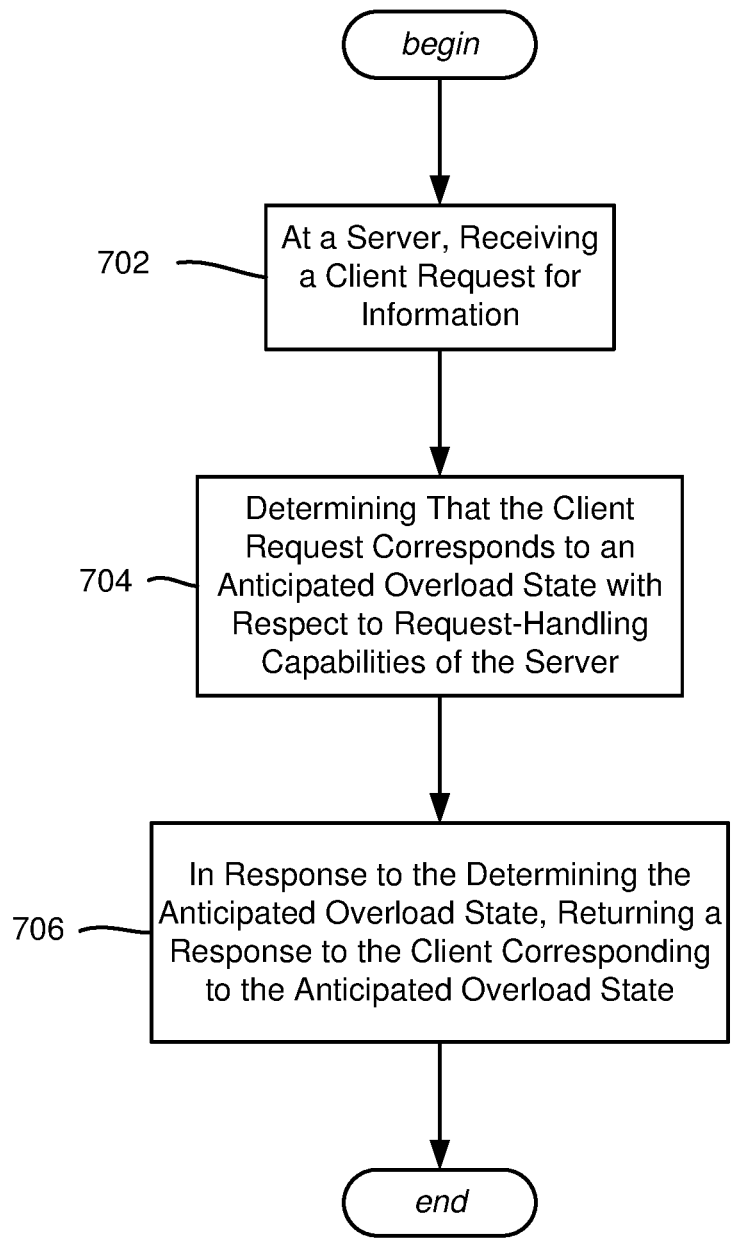
FIG. 7 is a flow diagram showing example logic/operations that may be performed to return an anticipated overload condition response, according to one or more example implementations.

One or more aspects of the technology described herein are directed towards the example operations of FIG. 7. Operation 702 of FIG. 7 represents at a server, receiving a client request for information. Operation 704 represents determining that the client request corresponds to an anticipated overload state with respect to a request-handling capability of the server. Operation 706 represents, in response to the determining the anticipated overload state, returning a response to the client corresponding to the anticipated overload state.

Returning the response to the client corresponding to the anticipated overload state can comprise returning a retry response instructing the client to retry the request after a time delay. Returning the response to the client corresponding to the anticipated overload state can comprise instructing the client to retry the request after a time delay, wherein the time delay is specified in the response. Returning the response to the client can comprise returning an HTTP: 509 response.

Determining that the client request corresponds to the anticipated overload state can comprise evaluating a request buffer counter.

One a more aspects can comprise discarding the client request for information.

The server can be part of a data service, and aspects can comprise communicating health-related information from the server to a component of the data service.

Figure 8:
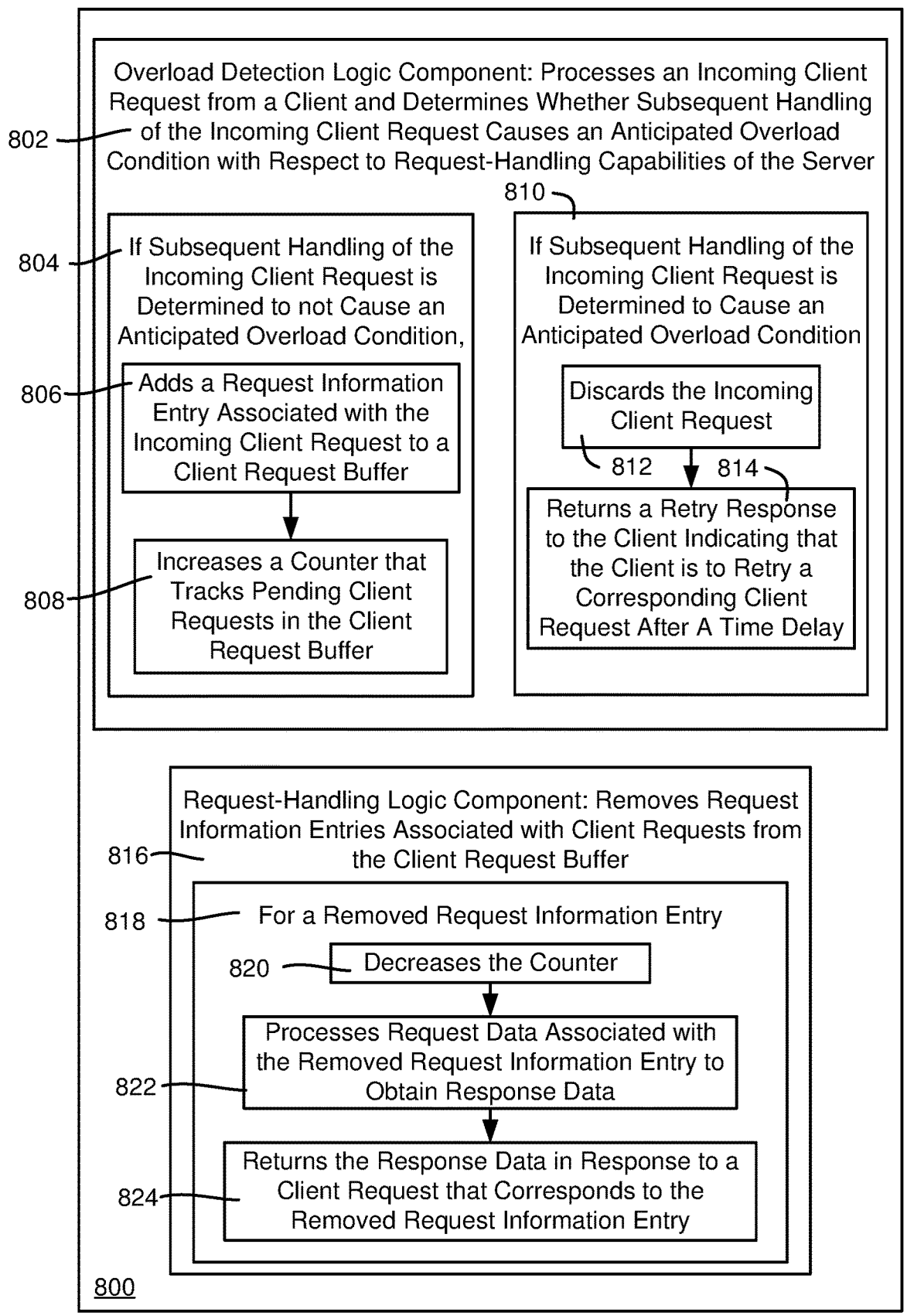
FIG. 8 is a block diagram showing example logic that prevents server overloading while handling client requests, according to one or more example implementations.

FIG. 8 represents example components of a server 800 that can implement aspects of the technology described herein. Block 802 represents an overload detection logic component that processes an incoming client request from a client and determines whether subsequent handling of the incoming client request causes an anticipated overload condition with respect to request-handling capabilities of the server. As represented via block 804, if subsequent handling of the incoming client request is determined to not cause an anticipated overload condition, the overload detection logic component adds a request information entry associated with the incoming client request to a client request buffer (block 806) and increases a counter that tracks pending client requests in the client request buffer (block 808). If (block 810) subsequent handling of the incoming client request is determined to cause an anticipated overload condition, the overload detection logic component discards the incoming client request (block 812) and returns a retry response to the client indicating that the client is to retry a corresponding client request after a time delay (block 814). The server 800 also comprises a request-handling logic component (block 816) that removes request information entries associated with client requests from the client request buffer. As represented via block 818, for a removed request information entry, the request-handling logic component 816 decreases the counter (block 822), processes request data associated with the removed request information entry to obtain response data (block 822), and returns the response data in response to a client request that corresponds to the removed request information entry (block 824).

The server can be part of a data service, and the server can be coupled to a health-related component of the data service to communicate health-related information with the health-related component of the data service; the health-related information can indicate that the server is currently operational within the data service. Aspects can comprise a load balancer of the data service coupled to the server and through which the incoming client request from the client is received at the server, and the health-related component of the data service can be incorporated into the load balancer.

Subsequent handling of the incoming client request can be determined to cause the anticipated overload condition, and the retry response can comprise time delay data that specifies how long the client is to delay before the corresponding client request is retried. Subsequent handling of the incoming client request can be determined to cause the anticipated overload condition, and the retry response can comprise an HTTP: 509 response.

Figure 9:
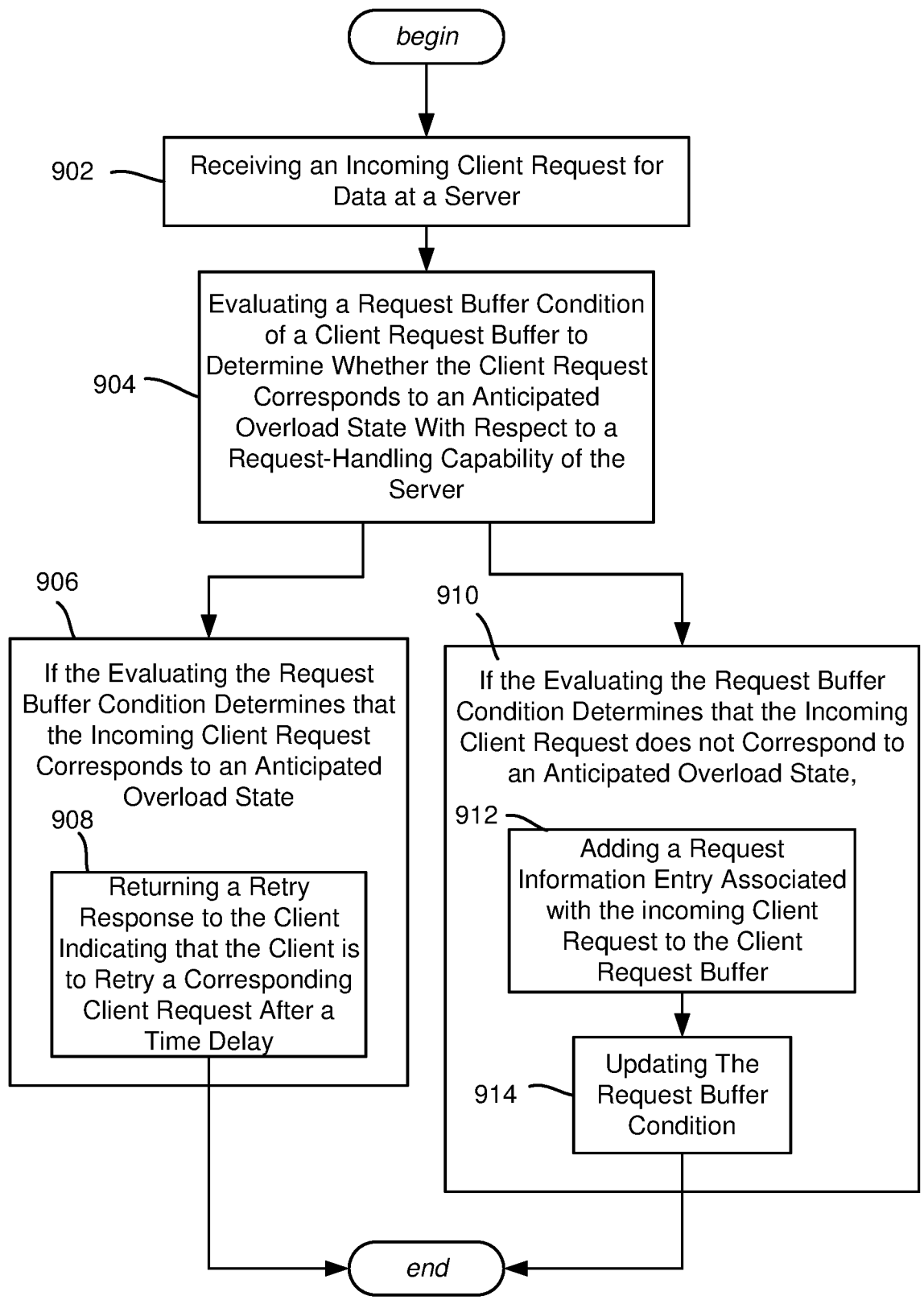
FIG. 9 is a flow diagram showing example logic/operations that may be performed to handle client requests or return an anticipated overload condition response based on a client request buffer condition, according to one or more example implementations.

FIG. 9 represents example operations, such as are performed when executed of machine-readable storage media having machine-executable instructions. Operation 902 represents receiving an incoming client request for data at a server. Operation 904 represents evaluating a request buffer condition of a client request buffer to determine whether the client request corresponds to an anticipated overload state with respect to a request-handling capability of the server. If the evaluating the request buffer condition determines that the incoming client request corresponds to an anticipated overload state (block 906), aspects comprise returning a retry response to the client indicating that the client is to retry a corresponding client request after a time delay (block 908). If the evaluating the request buffer condition determines that the incoming client request does not correspond to an anticipated overload state (block 910), aspects comprise adding a request information entry associated with the incoming client request to the client request buffer (block 912), and updating the request buffer condition (block 914).

Returning the retry response to the client can comprise instructing the client to retry the request after a time delay, wherein the time delay is specified in the response. Returning the response to the client can comprise returning an HTTP: 509 response.

Evaluating the request buffer condition can comprise evaluating an overload counter that tracks a number of entries in the request buffer. Updating the request buffer condition can comprise increasing the overload counter in conjunction with the adding the request information entry associated with the incoming client request to the client request buffer.

Aspects can comprise removing request information entries associated with client requests from the client request buffer, and for a removed request information entry, decreasing the overload counter.

Aspects can comprise processing request data associated with the removed request information entry to obtain response data, and returning the response data in response to a client request that corresponds to the removed request information entry.

If the evaluating the request buffer condition determines that the incoming client request corresponds to an anticipated overload state, further aspects can comprise discarding the client request.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 10 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
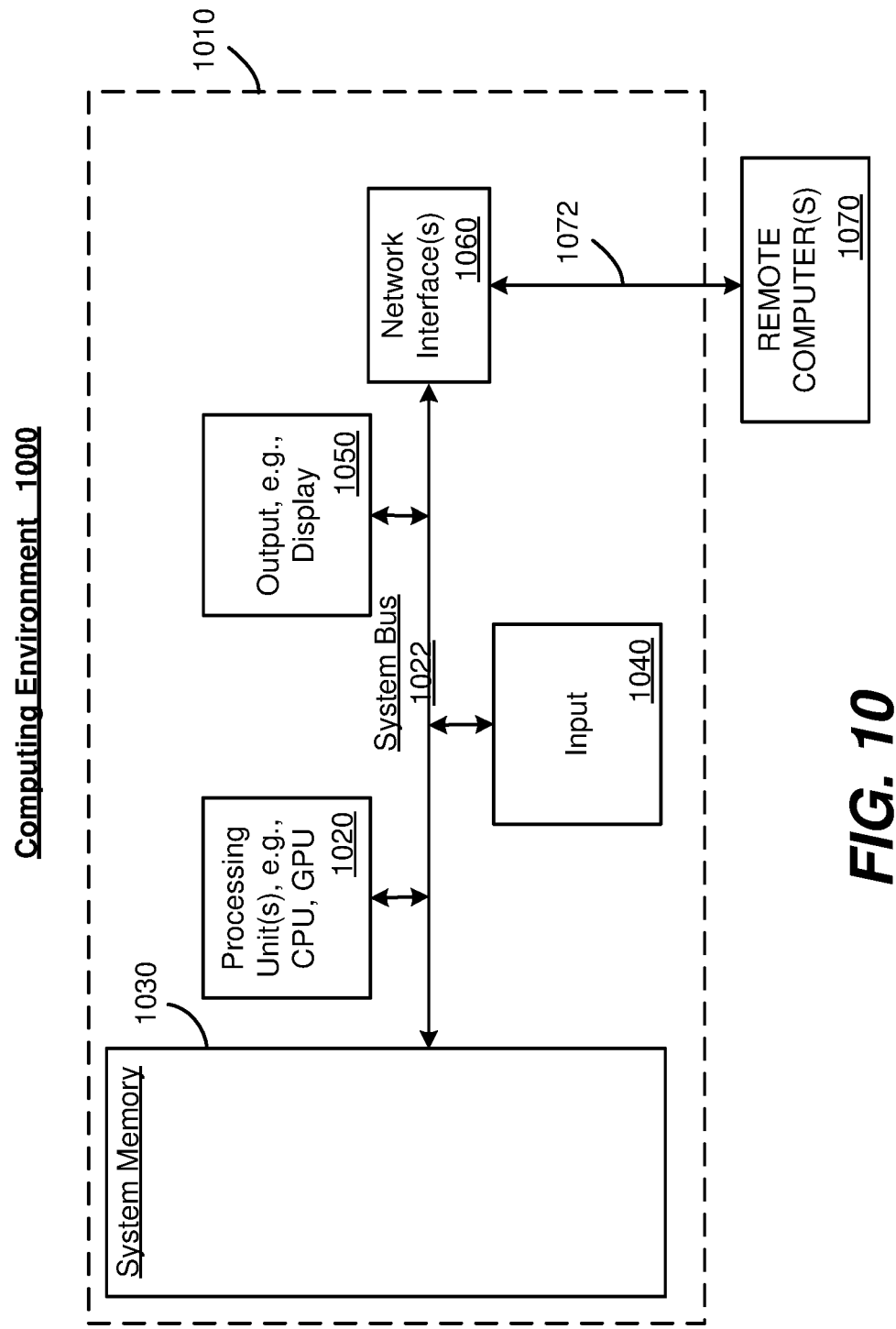
FIG. 10 is a block diagram representing an example computing environment into which aspects of the subject matter described herein may be incorporated.

FIG. 10 thus illustrates an example of a suitable computing system environment 1000 in which one or more aspects of the implementations described herein can be implemented, although as made clear above, the computing system environment 1000 is only one example of a suitable computing environment and is not intended to suggest any limitation as to scope of use or functionality. In addition, the computing system environment 1000 is not intended to be interpreted as having any dependency relating to any one or combination of components illustrated in the example computing system environment 1000.

With reference to FIG. 10, an example device for implementing one or more implementations includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of machine (e.g., computer) readable media and can be any available media that can be accessed by a machine such as the computer 1010. The system memory 1030 may include computer storage media in the form of volatile and/or nonvolatile memory such as read only memory (ROM) and/or random access memory (RAM), and hard drive media, optical storage media, flash media, and so forth. By way of example, and not limitation, system memory 1030 may also include an operating system, application programs, other program modules, and program data.

A user can enter commands and information into the computer 1010 through one or more input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

Conclusion

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
a processor; and
a memory that stores executable instructions which, when executed by the processor, facilitate performance of operations, the operations comprising:
receiving, at a server, a client request for information;
in response to determining that subsequent handling of the client request would place the server into an anticipated overload state, returning an HTTP: 509 response to a client, wherein the anticipated overload state is defined by a buffer threshold at which a buffer of the server is less than full; and
deleting the client request for information.

2. The system of claim 1, wherein the operations further comprise:
returning a retry response instructing the client to retry the client request.

3. The system of claim 1, wherein the operations further comprise:
returning a retry response instructing the client to retry the client request after a time delay.

4. The system of claim 3, wherein the time delay is specified in the retry response.

5. The system of claim 1, wherein the determining that subsequent handling of the client request would place the server into the anticipated overload state comprises evaluating a request buffer counter.

6. The system of claim 5, wherein the evaluating the request buffer counter includes comparing the request buffer counter to the buffer threshold.

7. The system of claim 1, wherein the server is part of a data service, and wherein the operations further comprise:
communicating health-related information from the server to a component of the data service.

8. A method, comprising:
determining, by a server comprising a processor, whether subsequent handling of an incoming client request from a client causes an anticipated overload condition with respect to request-handling capabilities of the server, wherein the anticipated overload state is defined by a buffer threshold at which a buffer of the server is less than full;
in response to determining that subsequent handling of the incoming client request causes the anticipated overload condition, deleting the incoming client request and returning an HTTP: 509 response to the client.

9. The method of claim 8, wherein the server is part of a data service, and further comprising communicating health-related information from the server to the data service, wherein the health-related information indicates that the server is currently operational within the data service.

10. The method of claim 9, further comprising a load balancer of the data service coupled to the server, and wherein the incoming client request from the client is received at the server via the load balancer.

11. The method of claim 8, further comprising:
in response to determining that subsequent handling of the incoming client request causes the anticipated overload condition, returning a retry response to the client, wherein the retry response indicates that the client is to retry the request after a time delay.

12. The method of claim 8, further comprising:
in response to determining that subsequent handling of the incoming client request causes the anticipated overload condition, returning a retry response to the client, wherein the retry response indicates that the client is to retry the request after a time delay based on time delay data in the retry response that specifies how long the client is to delay before a corresponding client request is retried.

13. A non-transitory machine-readable storage medium having machine-executable instructions, which when executed perform operations, the operations comprising:
receiving an incoming client request for data at a server;
inferring that the incoming client request would put the server into an anticipated overload state, wherein the anticipated overload state is defined by a buffer threshold at which a buffer of the server is less than full; and in response to such inference, deleting the incoming client request and returning an HTTP: 509 response to a client.

14. The non-transitory machine-readable storage medium of claim 13, wherein the operations further comprise:

in response to such inference, instructing the client to retry the incoming client request after a time delay.

15. The non-transitory machine-readable storage medium of claim 13, wherein the operations further comprise:

in response to such inference, instructing the client to retry the incoming client request after a time delay, wherein the time delay is specified in such instruction.

16. The non-transitory machine-readable storage medium of claim 13, wherein the inferring that the incoming client request would put the server into the anticipated overload state comprises evaluating an overload counter that tracks a number of entries in a client request buffer of the server.

17. The non-transitory machine-readable storage medium of claim 16, wherein the evaluating the overload counter includes comparing the overload counter to the buffer threshold.

18. The non-transitory machine-readable storage medium of claim 16, wherein the operations further comprise:

increasing the overload counter in conjunction with adding a request information entry associated with the incoming client request to the client request buffer.

19. The non-transitory machine-readable storage medium of claim 16, wherein the operations further comprise:

removing one or more request information entries associated with one or more client requests from the client request buffer, and for a removed request information entry, decreasing the overload counter.

20. The non-transitory machine-readable storage medium of claim 19, wherein the operations further comprise:

processing request data associated with the removed request information entry to obtain response data; and returning the response data in response to a client request that corresponds to the removed request information entry.

* * * * *